United States Patent [19]

Herrmann

[11] Patent Number: 4,790,722
[45] Date of Patent: Dec. 13, 1988

[54] MULTI-BLADE ROTOR FOR A WINDMILL-TYPE APPARATUS

[75] Inventor: Hans-Joachim Herrmann, Schwabach, Fed. Rep. of Germany

[73] Assignee: M A N Gutehoffnungshütte GmbH, Oberhausen, Fed. Rep. of Germany

[21] Appl. No.: 943,647

[22] Filed: Dec. 17, 1986

[30] Foreign Application Priority Data

Dec. 18, 1985 [DE] Fed. Rep. of Germany ....... 3544814

[51] Int. Cl.[4] .......................... F07D 1/06; B64C 11/06
[52] U.S. Cl. ...................................... 416/205; 416/136
[58] Field of Search ............ 416/136 R, 136 A, 138 R, 416/138 A, 205, 207, 147; 496/208, 209, 210

[56] References Cited

U.S. PATENT DOCUMENTS

| | | | |
|---|---|---|---|
| 1,867,715 | 7/1932 | Seidel | 416/164 |
| 1,870,401 | 8/1932 | Caldwell | 416/207 |
| 1,919,586 | 7/1933 | Dodge | 416/136 R |
| 2,083,439 | 6/1937 | Fedden et al. | 416/207 |
| 2,146,367 | 2/1939 | Berliner | 416/138 A |
| 2,233,364 | 2/1941 | Gemeny | 416/212 R X |
| 2,420,424 | 5/1947 | Hacket et al. | 416/205 |
| 2,435,540 | 2/1948 | Hardy | 416/207 |
| 3,594,097 | 7/1971 | Mouille et al. | 416/136 X |
| 4,281,966 | 8/1981 | Duret et al. | 416/136 X |

FOREIGN PATENT DOCUMENTS

| | | | |
|---|---|---|---|
| 316487 | 4/1934 | Italy | 416/209 |
| 470654 | 9/1975 | U.S.S.R. | 416/205 |
| 385074 | 1/1933 | United Kingdom | 416/136 |
| 449664 | 7/1936 | United Kingdom | 416/138 |
| 456126 | 11/1936 | United Kingdom | 416/220 A |
| 1020896 | 2/1966 | United Kingdom | 416/138 R |

Primary Examiner—Everette A. Powell, Jr.
Attorney, Agent, or Firm—Becker & Becker, Inc.

[57] ABSTRACT

A multi-blade rotor for a windmill-type apparatus, including a hub supported on a shaft or a fixed angle, and rotor blades that are connected to the hub, via bearing arrangement, in such a way that the rotor blades are rotatable about their longitudinal axes. The inventive easy-to-manufacture, and relatively lightweight, hub has rotationally symmetrical hollow bodies, the number of which correspond to the number of rotor blades. The hollow bodies are mounted on rod-like or tubular pressure members, the number of which correspond to the number of hollow bodies. The pressure members are mounted on the shaft or fixed axle via bearing plates in such a way that their longitudinal central axes are respectively disposed at or nearly at the point of concentration of the bending moment surface of the pertaining hollow body. The latter are held together by a radially disposed tie rod system that includes prestressed tie rods that extend in or nearly in the axes of symmetry of the hollow bodies, with the prestress of the tie rods being such that the hollow bodies are stressed thereby with compressive forces only.

7 Claims, 1 Drawing Sheet

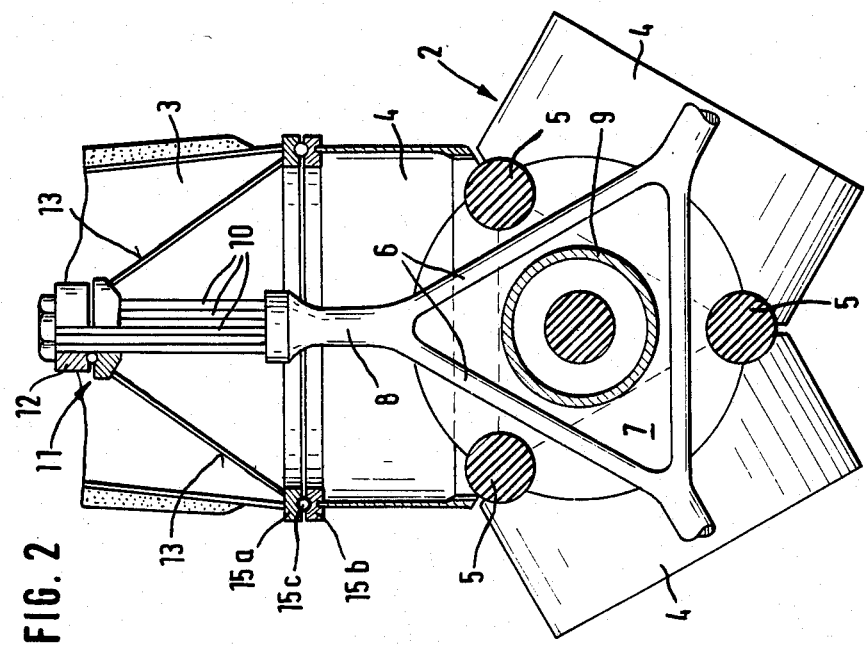
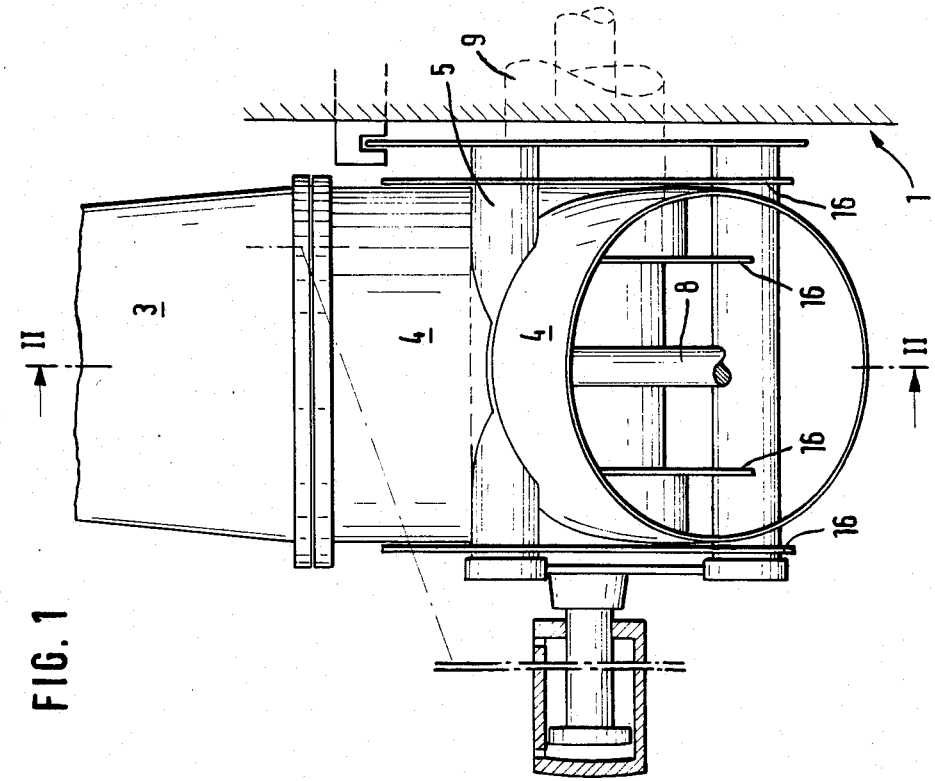

MULTI-BLADE ROTOR FOR A WINDMILL-TYPE APPARATUS

BACKGROUND OF THE INVENTION

1. Field of the Invention

The present invention relates to a multi-blade rotor for a windmill-type apparatus, including a hub supported on a shaft or fixed axle, and rotor blades that are connected to the hub, via bearing means, in such a way that the rotor blades are rotatable about their longitudinal axes.

2. Description of the Prior Art

In a windmill-type apparatus, in addition to wind stresses, cyclically acting forces and moments caused by the rotating rotor also occur. The stresses resulting from the rotation of the rotor are essentially alternating bending loads that are caused by the weight of the rotor blades and occur with each rotation of the rotor during the entire life expectancy; generally more than $1 \times 10^8$ load reversals are produced. Since only relatively small stress amplitudes can be endured by the material due to breaks in the surface (threaded bores, holes, grooves, etc.), mold effects from casting and welded part contours, as well as irregularities in the material, the components (hub, rotor blade connection) subjected to such alternating bending loads must be very thick, and therefore have large masses, which is determinative for the dimensioning of the overall windmill-type apparatus, and stands in the way of the requirement for an optimum, economical construction.

It is therefore an object of the present invention to provide a multi-blade rotor of the aforementioned general type that has a hub which is easy to manufacture and which is characterized by a relatively low weight.

BRIEF DESCRIPTION OF THE DRAWING

This object, and other objects and advantages of the present invention, will appear more clearly from the following specification in conjunction with the accompanying schematic drawing, in which:

FIG. 1 is a partially sectioned side view of one exemplary embodiment of the inventive portion of a windmill-type apparatus; and FIG. 2 is a view taken along the line II—II in FIG. 1.

SUMMARY OF THE INVENTION

The multi-blade rotor of the present invention is characterized primarily in that the hub has rotationally symmetrical hollow bodies, the number of which correspond to the number of rotor blades, with the hollow bodies being mounted on rod-like or tubular pressure members, the number of which correspond to the number of hollow bodies; the pressure members are mounted on the shaft or fixed axle via bearing plates in such in a way that their longitudinal central axes are respectively disposed at or nearly at the point of concentration of the bending moment surface of the pertaining hollow body; the hollow bodies are held together by a radially disposed tie rod system that includes prestressed tie rods that extend in or nearly in the axes of symmetry of the hollow bodies, with the prestress of the tie rods being such that the hollow bodies are stressed thereby with compressive forces only.

Due to the appropriately prestressed hub components, which are joined together without using bolts and free of irregularities, including grooves, notches, slots, holes as well as depressions and the like that would produced breaks in the surface, it is possible to stress the hub construction in the compressive range only. The hub construction can be continuously stressed at critical high amplitudes, with the tensioned tie rod system, which is disposed in the neutral axes of the hollow body, being nearly free from bending, so that it has relatively low stress amplitudes to absorb. The proposal of the present invention therefore enables an extremely lightweight construction in the fatigue strength range, which is cost effective for the overall windmill-type apparatus. Furthermore, the operational reliability is relatively high, since cracks in components that are stressed with compressive forces only do not lead to spontaneous failure. In addition, assembly of the hub, which comprises a number of small parts, can be undertaken on location. Finally, the straightforward hub parts can also easily be made as parts having smooth surfaces, which simplifies corrosion protection.

Pursuant to a further advantageous specific embodiment of the present invention, thrust bearings as well as rods, tubes, shells, or the like that are disposed on an imaginary truncated cone surface, are disposed between the tie rod system and the flanges that form the base of the rotor blades. As a result of these measures, a connection of the rotor blades that is free of play can be effected without impairing rotary movement, so that destruction of the blade bearing due to impact is prevented.

The high alternating stresses in the compressive range can also be used for the rotor blades if, pursuant to a further proposal of the present invention, that portion of each rotor blade near the hub is embodied as a pressure cylinder or pressure cone, and is prestressed via long, twisted rods that form the outer portion of the tie rods and permit rotation of the rotor blades.

To increase the reliability of the central anchor system, the radially outer portions of the tie rods ae formed by a plurality of tension members that are rigidly connected to the inner parts of the tie rods near the hub. Failure of a given tension member can be indicated by a sensor signal, so that the windmill-type apparatus can be stopped in response thereto.

The rotor blade bearing is embodied in a particularly straightforward and economical manner, with each such bearing comprising two rings and roller bodies disposed therebetween. The outer and inner rings are rigidly connected with the rotor blades and the hollow bodies respectively.

Further specific features of the present invention will be described in detail subsequently.

DESCRIPTION OF PREFERRED EMBODIMENTS

Referring now to the drawing in detail, a wall portion of a tower is designated with the reference numeral 1. The rotor head 2 of a windmill-type apparatus is mounted on the tower wall 1 in such a way as to be rotatable about the longitudinal axis of the tower. The rotor blades 3 are secured to the hub of the rotor head 2 in such a way as to be rotatable about their longitudinal axes.

The hub is provided with, for example, three rotationally symmetrical, radially disposed hollow bodies 4 that have a shell-like form. In particular, the hollow bodies 4 are in the shape of hollow cylinders, hollow truncated cones, or the like, with all of the hollow bodies having the same shape, which in the illustrated embodiment is that of a hollow cylinder. Each of the hollow bodies 4, at radially inner ends thereof respectively, is provided with four tunnel-shaped recesses, via which the hollow bodies 4 rest against one another through the intervention of three rod-like or bar-like pressure members 5 that in the illustrated embodiment are disposed horizontally. The hollow bodies 4 and pressure members 5 are held together by a central anchor system 6, 7, 8 that has tie rods 8 which, via known mechanical or hydraulic-type tensioning mechanisms, are prestressed to such an extent that the hollow bodies 4 are stressed only in the compressive range. In conformity with the three rotor blades 3, the central anchor system has a triangular, hollow central part 6 within the hollow bodies 4. The fixed, horizontal shaft 9 of the rotor is conveyed through the central opening 7 of the part 6. The central anchor system also includes the aforementioned tie rods 8, which extend radially outwardly from the central part 6, and are arranged in such a way that their longitudinal central axes are disposed in the axes of symmetry of the pertaining hollow bodies 4.

Either directly, or, as illustrated in FIG. 2, through the interposition of several tension members 10 that form the radially outer portion of the tie rods 8, each of the latter is secured to, or via intermediate means 12 is supported on, the radially outer ring of a thrust bearing 11 that comprises two rings and the roller bodies disposed therebetween. For ease of illustration, this arrangement is shown in connection with only one tie rod 8. The dimensions of each thrust bearing 11 are relatively small in comparison to the remaining dimensions of the rotor. Via rods 13, truncated cone-like shells, or the like, which are disposed in the cone surface of an imaginary hollow truncated cone, the radially inner ring of each thrust bearing 11 is supported directly or indirectly on a flange that forms the base of the associated rotor blade 3 and is rigidly connected therewith.

However, it is also possible to dispense with the thrust bearing 11 if that portion of each rotor blade 3 near the hub, for example over a third of the length of the rotor blade, is embodied as a pressure cylinder or pressure cone that is prestressed over the radial extension of the tension members, which form the tie rods and are of relatively great length. When the rotor is not moving, the tension members are under torsional stress. However, when the rotor is moving, and the rotor blade has been turned into the operational position, the torsional stress is again eliminated.

The rotor blades 3 are connected to the pertaining hollow bodies or cylinders 4 via a respective roller bearing 15 that enables setting angle movements of the rotor blades about their longitudinal axes. The roller bearings 15, in a manner known per se, each comprise two rings 15a, 15b and the non-prestressed roller bodies 15c that are disposed between the rings. The radially outer rings 15a (the aforementioned flanges) are rigidly connected to the rotor blades, with the race for the roller bodies advantageously being formed in the flange. The radially inner rings 15b are rigidly connected to the walls of the hollow bodies 4.

The pressure members 5 are disposed in the point of concentration of the "bending moment surface" of the hollow bodies 4, and are each supported by two or more bearing plates 16 on the fixed shaft 9 or, in the event that the rotor is supported on a driven shaft, on the latter.

The shaft 9 (or the driven shaft) that supports the hub is customarily horizontal, as illustrated in the drawing. However, this shaft can also be disposed at an incline relative to the horizontal; this can be necessary, in order to obtain clearance from the tower, for windmill-type apparatus that have a tower which is braced by cables. The angle of inclination of the shaft 9 (or of the driven shaft) can, for example, be $+7°$ with the plus sign indicating an upward deviation.

The pretensioning achieved with the tie rod system is such during operation that no withdrawal or lifting-up of the blade flanges can occur. However, for special situations, for example for seldom-occurring extremely strong gusts of wind, it can be advantageous to merit the blade flanges to lift off in order to reduce bearing friction, and hence smaller adjustment forces for adjusting the rotor blades. In so doing, the tension in the tie rod system increases without appreciably affecting the life expectancy, due to the infrequency of the occurrences. Under such circumstances tension forces could also occur in the hollow bodies 4, which are otherwise under compressive forces, but again without appreciably affecting the life expectancy; this is particularly the case if the hollow bodies 4 are clamped or welded to the pressure members 5.

The present invention is, of course, in no way restricted to the specific disclosure of the specification and drawing, but also encompasses any modifications within the scope of the appended claims.

What I claim is:

1. In a windmill-type apparatus of a wind power installation having a multi-blade rotor including a hub supported on shaft means, and rotor blades that are connected to said hub, via bearing means, in such a way that said rotor blades are rotatable about their longitudinal axes, said hub having the improvement therewith comprising:

rotationally symmetrical hollow bodies, the number of which corresponds to the number of rotor blades journaled on said hub, said hollow bodies being provided with a shell-type construction and respectively being joined free of any screw bolts and irregularities including holes, notches, grooves, slots, depressions and the like for a smooth surfacing therewith;

rod-like pressure members on which said hollow bodies are mounted, with the number of said pressure members corresponding to the number of said hollow bodies; said pressure members being mounted on said shaft means, via bearing plates, having longitudinal central axes of said pressure members respectively disposed at least nearly at the point of concentration of the bending moment surface of the pertaining hollow body; and a radially disposed tie rod system that holds said hollow bodies together and includes prestressed tie rods that extend at least nearly in the axes of symmetry of said hollow bodies, with said prestress of said tie rods being located extending in the axes of symmetry of said hollow bodies that are substantially free of any bending load thereon and that are stressed thereby with only compressive forces.

2. A rotor according to claim 1, in which each of said rotor blades is provided with a base, in the form of a flange, for connection to said hub, with thrust bearings and further rod-like members being disposed between, and interconnecting, said tie rod system and said flanges.

3. A rotor according to claim 2, in which said thrust bearings are respectively connected to given ones of said tie rods, and said further rodlike members, which for a given tie rod are disposed on an imaginary truncated cone surface, interconnect the thrust bearing and flange of a given rotor blade.

4. A rotor according to claim 1, in which that portion of a given rotor blade that is proximate to said hub is embodied as a pressure cylinder or pressure cone, and is prestressed via long, twisted rods that form the outer portion of said tie rods and permit rotation of said rotor blades.

5. A rotor according to claim 1, in which the radially outer portion of a given tie rod is formed by a plurality of tension members that are fixedly connected to radially inner portions of said tie rod near said hub.

6. A rotor according to claim 1, in which each of said rotor blades is provided with a base in the form of a flange that is rigidly connected thereto; and in which said bearing means for connection of said rotor blade to said hub comprises two rings and roller bodies disposed therebetween, with a radially outer one of said rings forms said flange, and a radially inner one of said rings is rigidly connected to one of said hollow bodies.

7. In combination with a windmill-type apparatus of a wind power installation having a multi-blade rotor including a hub supported on shaft means, and rotor blades that are connected to said hub, via bearing means, in such a way that said rotor blades are rotatable about their longitudinal axes, said hub having the improvement therewith comprising:

rotationally symmetrical hollow bodies, the number of which corresponds to the number of rotor blades journaled on said hub, said hollow bodies each being provided with a shell-type construction and respectively being joined free of any screw bolts and irregularities including holes, notches, grooves, slots, depressions and the like for a smooth surfacing therewith;

rod-like pressure members on which said hollow bodies are mounted, with the number of said pressure members corresponding to the number of said hollow bodies; said pressure members being mounted on said shaft means, via bearing plates, having longitudinal central axes of said pressure members respectively disposed at least nearly at the point of concentration of the bending moment surface of the pertaining hollow body; and a radially disposed tie rod system that holds said hollow bodies together and includes prestressed tie rods that extend at least nearly in the axes of symmetry of said hollow bodies, with said prestress of said tie rods being located extending in the axes of symmetry of said hollow bodies that are substantially free of any bending load thereon and that are stressed thereby with only compressive forces each of said rotor blades being provided with a base, in the form of a flange, for connection to said hub, as well as thrust bearings and further rod-like members being disposed between, and interconnecting, said tie rod system and said flanges.

* * * * *